(12) United States Patent
Moinuddin et al.

(10) Patent No.: US 11,368,349 B1
(45) Date of Patent: Jun. 21, 2022

(54) CONVOLUTIONAL NEURAL NETWORKS BASED COMPUTATIONALLY EFFICIENT METHOD FOR EQUALIZATION IN FBMC-OQAM SYSTEM

(71) Applicant: King Abdulaziz University, Jeddah (SA)

(72) Inventors: Muhammad Moinuddin, Jeddah (SA); Ubaid M. Al-Saggaf, Jeddah (SA); Abdulrahman U. Alsaggaf, Jeddah (SA); Shujaat Khan, Daejeon (KR); Syed Sajjad Hussain Rizvi, Karachi (PK)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/526,619

(22) Filed: Nov. 15, 2021

(51) Int. Cl.
*H04L 27/26* (2006.01)
*G06N 3/02* (2006.01)
*H04L 27/01* (2006.01)

(52) U.S. Cl.
CPC ......... *H04L 27/26416* (2021.01); *G06N 3/02* (2013.01); *H04L 27/01* (2013.01); *H04L 27/261* (2013.01)

(58) Field of Classification Search
CPC . H04L 27/26416; H04L 27/01; H04L 27/261; G06N 3/02
See application file for complete search history.

(56) References Cited

U.S. PATENT DOCUMENTS

| | | | |
|---|---|---|---|
| 10,833,785 B1 | 11/2020 | O'Shea et al. | |
| 2018/0019905 A1* | 1/2018 | Zhu | H04L 27/264 |
| 2020/0090046 A1* | 3/2020 | Sozubek | G06N 3/084 |
| 2021/0050932 A1* | 2/2021 | Xuan | H04L 1/203 |
| 2021/0064996 A1* | 3/2021 | Wang | G06N 3/04 |
| 2021/0084601 A1 | 3/2021 | Rofougaran et al. | |
| 2021/0144034 A1* | 5/2021 | Marcoux | H04L 27/2014 |
| 2021/0184795 A1* | 6/2021 | Ibars Casas | H04W 88/06 |
| 2021/0243056 A1* | 8/2021 | Li | H03F 1/32 |
| 2021/0320825 A1* | 10/2021 | Banuli Nanje Gowda | H04L 25/0246 |
| 2021/0329267 A1* | 10/2021 | Kianfar | H04N 19/463 |
| 2021/0398615 A1* | 12/2021 | Chu | G16B 25/00 |

FOREIGN PATENT DOCUMENTS

| | | |
|---|---|---|
| CN | 111740934 A | 10/2020 |
| CN | 112118066 A | 12/2020 |

OTHER PUBLICATIONS

Waseem, et al. ; Channel equalization for MIMO-FBMC systems ; 2016 International Conference on Intelligent Systems Engineering (ICISE) ; Jan. 15-17, 2016.

* cited by examiner

*Primary Examiner* — Freshteh N Aghdam
(74) *Attorney, Agent, or Firm* — Oblon, McClelland, Maier & Neustadt, L.L.P.

(57) ABSTRACT

A filter bank multi-carrier (FBMC)-offset quadrature amplitude modulation (OQAM) system is disclosed. The FBMC-OQAM system includes a processing circuitry which is configured to receive a signal over a transmission medium, equalize the signal by a convolution neural network (CNN) equalizer, wherein the CNN equalizer is configured to estimate the received signal without performing channel estimation, and output the estimated signal as a bit stream.

14 Claims, 11 Drawing Sheets

CONVOLUTIONAL NEURAL NETWORKS BASED COMPUTATIONALLY EFFICIENT METHOD FOR EQUALIZATION IN FBMC-OQAM SYSTEM

STATEMENT OF ACKNOWLEDGEMENT

The inventors extend their appreciation to the Deputyship for Research and Innovation, Ministry of Education in Saudi Arabia for funding this research work through the project number 2020-063 and King Abdulaziz University, DSR, Jeddah, Saudi Arabia.

BACKGROUND

Technical Field

The present disclosure is directed to convolutional neural networks based computationally efficient system and method for equalization in filter bank multi-carrier (FBMC)-Offset Quadrature Amplitude Modulation (OQAM).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

High throughput and efficient spectral properties are desirable in a majority of wireless multimedia applications. Various methods have been developed in order to enhance the throughput and the spectral properties. Examples of such methods include Cyclic Prefixed Orthogonal Frequency Division Multiplexing (CP-OFDM), windowed OFDM, Filter Bank Multi-Carrier (FBMC), and FBMC-Offset Quadrature Amplitude Modulation (OQAM) methods. The FBMC-OQAM method has lower out-of-band emissions (OOB) in comparison to that of the OFDM. This, however, comes at the expense of losing the complex orthogonality of signal waveforms. In FBMC-OQAM method, complex orthogonality condition is replaced by real orthogonality condition, which results in producing imaginary interference. Thus, it requires special dealing in designing channel estimation and equalization techniques. Accordingly, the FBMC-OQAM method facilitates in achieving higher spectral efficiency, however it suffers from imaginary interference due to loss in complex orthogonality.

A FBMC-PON demodulation method is described in Chinese Patent Application No. CN 112118066 A, "FBMC-PON demodulation method based on improved convolutional neural network"; techniques for processing communications signals using a machine-learning network are described in U.S. Pat. No. 10,833,785 B1, "Processing communications signals using a machine-learning network"; a method for detecting underwater acoustic FBMC communication signals based on deep learning is described in Chinese Patent Application No. CN 111740934 A, "Underwater acoustic FBMC communication signal detection method based on deep learning"; and a communication system and method for high sensitivity 5th generation (5G) signals detection using a neural network are described in U.S. Patent Application No. US 2021/0084601 A1, "5G signals detection using neural network", each incorporated herein by reference in its entirety. Further, a modified neural network based algorithm (NN) which is based on mean-squared error (MSE) trained for MIMO-FBMC systems with QAM modulation (QAM) has been described. See: Waseem, Athar, et al., "*Channel equalization for MIMO-FBMC systems*", IEEE incorporated herein by reference in its entirety). However, the systems and methods described in these references and other conventional systems suffer from various limitations including high computational complexity.

Accordingly, it is one object of the present disclosure to provide systems and methods for performing an equalization efficiently and with low computational complexity.

SUMMARY

In an exemplary embodiment, a method of performing an equalization in Filter Bank Multi-Carrier (FBMC)-Offset Quadrature Amplitude Modulation (OQAM) system is disclosed. The method includes receiving a signal over a transmission medium, equalizing the signal by a convolution neural network (CNN) equalizer, wherein the CNN equalizer is configured to estimate the received signal without performing channel estimation, and outputting the estimated signal as a bit stream.

In another exemplary embodiment, a FBMC-OQAM system is disclosed. The FBMC-OQAM system includes a processing circuitry configured to receive a signal over a transmission medium, equalize the signal by a CNN equalizer, wherein the CNN equalizer is configured to estimate the received signal without performing channel estimation, and output the estimated signal as a bit stream.

In yet another exemplary embodiment, a non-transitory computer readable medium that stores a program that when executed by a computer causes the computer to perform a method including receiving a signal over a transmission medium, equalizing the signal by a CNN equalizer, wherein the CNN equalizer is configured to estimate the received signal without performing channel estimation, and outputting the estimated signal as a bit stream.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
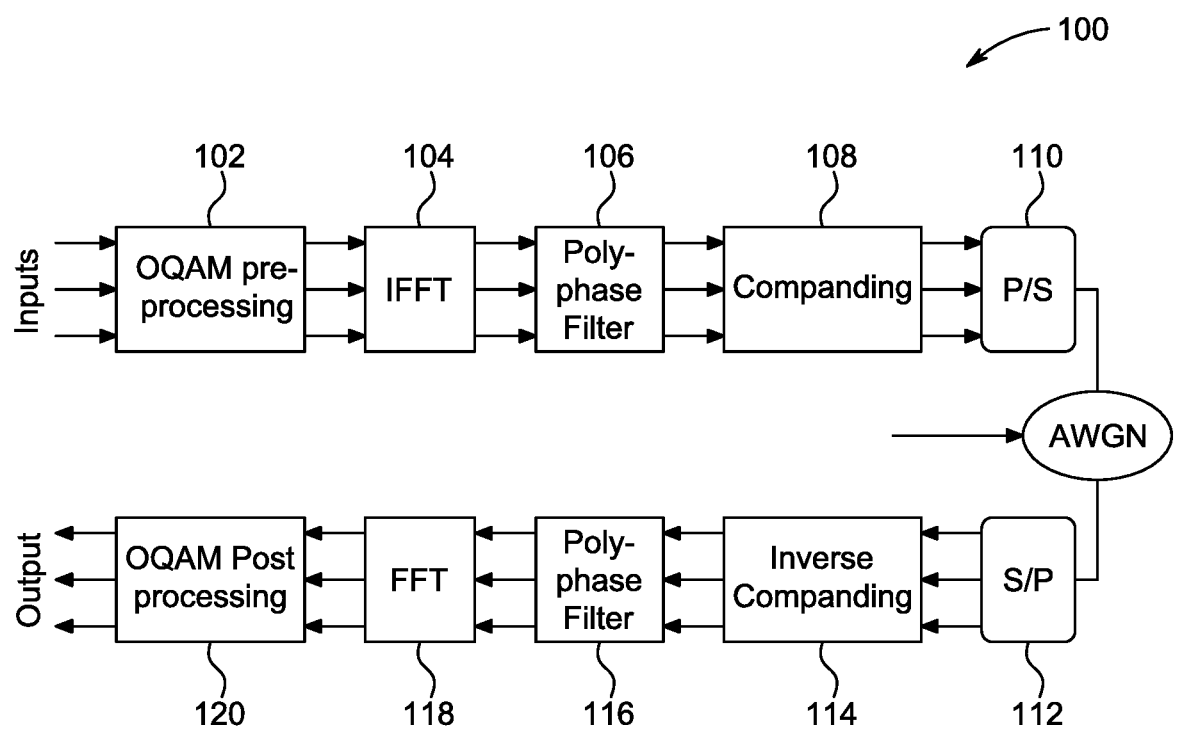
FIG. 1 illustrates a block diagram of a Filter Bank Multi-Carrier (FBMC)-Offset Quadrature Amplitude Modulation (OQAM) system, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a Filter Bank Multi-Carrier (FBMC)-Offset Quadrature Amplitude Modulation (OQAM) system and a method of performing an equalization in the FBMC-OQAM system. In the present disclosure, Convolutional Neural Networks (CNN) is adapted for equalization without requiring channel estimation, and hence it reduces the complexity of the FBMC-OQAM system.

FIG. 1 illustrates a block diagram of an FBMC-OQAM system 100, according to exemplary aspects of the present disclosure.

As described in FIG. 1, the FBMC-OQAM system 100 includes an OQAM pre-processing block 102, an Inverse Fast Fourier Transform (IFFT) block 104, a poly-phase filter 106, a companding block 108, a Parallel to Series (P/S) converter 110, an Additive White Gaussian Noise (AWGN) block 112, a Series-to-Parallel (S/P) converter 114, an inverse companding block 116, a poly-phase filter 118, an FFT block 120, and an OQAM post processing block 122.

The OQAM pre-processing block 102 is configured to maintain orthogonality between subcarriers. The OQAM pre-processing block 102 processes complex symbols in real part and virtual part, and interlaces half a symbol period in time interval to become transmission symbols. Accordingly, the real and imaginary parts of the interleaved delay are divided into subcarriers. The OQAM post processing block 122 is configured to take a real part of a signal modulated to the subcarrier and then reconstruct the real part of the signal into a complex signal through mutual conversion of a real number and complex number. The IFFT block 104 is configured to perform an IFFT operation on the transmission symbols. The poly-phase filter 106 and the poly-phase filter 118 are configured to decompose a signal. The companding block 108 is configured to attenuate high peaks of a signal and amplify low amplitudes of the signal. The inverse companding block 116 is configured to recover the original signal. The P/S converter 110 is configured to convert a signal from a parallel format to a serial format. The S/P converter 114 is configured to convert a signal from a serial format to a parallel format. The FFT block 120 is configured to convert a signal using FFT. The AWGN block 112 is configured to add white Gaussian noise to a signal.

For the FBMC-OQAM system 100, complex orthogonality condition $\langle g11,k1(t), g12,k2(t)\rangle = \delta(12-11), (k2-k1)$ is substituted by less strict real orthogonality condition $R\{\langle g11,k1(t), g12,k2(t)\rangle\} = \delta(12-11),(k2-k1)$. The transmitted basis pulse for $l^{th}$ frequency and $k^{th}$ time symbol denoted by $g_{l,k}(t)$ can be defined as:

$$g_{l,k}(t) = p(t-kT)e^{\frac{j2\pi}{F(t-kT)}} e^{j\theta_{l,k}}, \qquad (1)$$

where $g_{l,k}$ represents the sampled version of the basis pulse $g_{l,k}(t)$. Further, $g_{l,k}$ is used to denote the N samples basis pulse vector for $l^{th}$ frequency and $k^{th}$ time symbol. In an example, there may be total L frequency sub-carries and K time symbols. Accordingly, by stacking all the basis pulse vectors in a large transmit matrix $G \in C^{N \times LK}$ as:

$$G = [g_{1,1} \ldots g_{L,1} g_{1,2} \ldots g_{L,K}] \qquad (2)$$

and all data symbols in a large transmit symbol vector $x \in C^{LK \times 1}$ as:

$$x = [x_{1,1} \ldots x_{1,K} x_{L,1} \ldots x_{L,K}]^T. \qquad (3)$$

The sampled transmit signal $s \in C^{N \times 1}$ is expressed as:

$$s = Gx. \qquad (4)$$

Also, multipath propagation over time-variant channels is modeled by a time-variant impulse response denoted as $h[m_\tau, n]$, where $m_\tau$ represents the delay and n represents the time position. In an example, the impulse response in a time-variant convolution matrix $H \in C^{N \times N}$ may be defined as:

$$[H]_{i,j} = h[i-j,i] \qquad (5)$$

Accordingly, the received signal can be expressed as:

$$r = HGx + \tilde{n} \qquad (6)$$

where, $\tilde{n}$ is a zero mean complex white Gaussian noise vector with correlation matrix $P_n I$ and $P_n$ is the noise power.

Further, the sampled receive basis pulses $q_{l,k} \in C^{N \times 1}$ can be stacked in a matrix as:

$$Q = [q_{1,1} \ldots q_{1,k} q_{L,1} \ldots q_{L,K}]. \qquad (7)$$

According to an aspect, the receiver of the FBMC-OQAM system 100 uses matched filter, that is, Q=G. Thus, the received signal as expressed in equation (6) after pulse de-shaping by Q=G can be written as:

$$y = G^H r = G^H H G x + n \qquad (8)$$

where, $n \sim CN(0, P_n G^H G)$. The received signal may be processed to obtain an estimate of the transmitted signal.

According to aspects of the present disclosure, a Convolution Neural Network (CNN) equalizer is applied for performing an equalization in an FBMC-OFDM system. The CNN is a specialized type of neural network. Unlike conventional fully connected dense neural network models where every neuron is hard-wired (i.e., connected) to the adjacent neuron, in CNN, each layer is connected to the next layer with the help of convolution pathways. The convolution pathways are defined by a number of convolution filters in that layer. This adaptive connectivity allows the CNN to learn spatially invariant features and reduce the computational cost. The CNN includes a plurality of layers which include a plurality of convolution layers, a dropout layer, and a plurality of activation function layers. In an example, the plurality of activation function layers include a plurality of rectified linear unit activation function layers and a plurality of linear layers. According to an aspect, the CNN equalizer is trained on inputted pilot signal sets as training samples. In an example, the inputted pilot signal sets include previously transmitted or known pilot signal sets. For example, the inputted pilot signal sets include currently received signal sets. Further, separate sets of training samples are used, which correspond to different noise ratios.

Figure 2A:
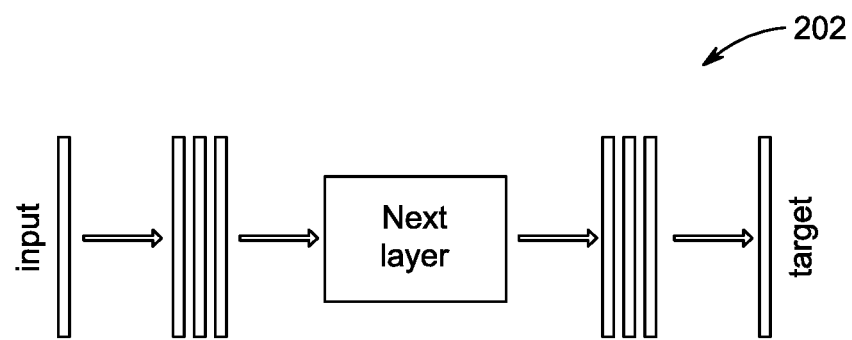
FIG. 2A illustrates a representation of a Convolution Neural Network (CNN) equalizer without skip connections, according to exemplary aspects of the present disclosure.
Figure 2B:
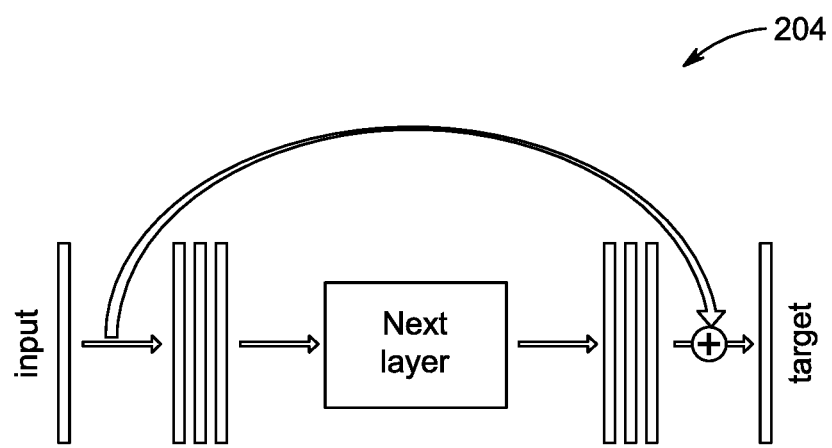
FIG. 2B illustrates a representation of the CNN equalizer with skip connections, according to exemplary aspects of the present disclosure.

The CNN equalizer uses skip connections by allowing at least one input layer to by-pass adjacent layers on route to a target layer. In an example, the skip connections during a testing phase allows one input layer to by-pass the adjacent layers with the help of a pooling operation or a pooling technique which improves decision, and during a training phase, the skip connections allow the back propagation of error gradient which help fast learning. In an example, with the linear increase in skip connections, the representation power of the CNN equalizer can be increased exponentially. Examples of pooling techniques include a max pooling technique, a min pooling technique, and an average pooling technique. The pooling technique allows the filtration of essential information from one layer to another layer of the CNN. In an example, according to the max pooling technique, the maximum signal may be selected. For example, only those filter's output are allowed to the next layer whose output is largest among all the selected set of signals. The selected set is defined by a pooling window size. Similarly, the min pooling technique and the average pooling technique may allow the minimum and average values, respectively. FIG. 2A illustrates a representation 202 of the CNN equalizer without the skip connections and FIG. 2B illustrates a representation 204 of the CNN equalizer with skip connections.

Figure 3:
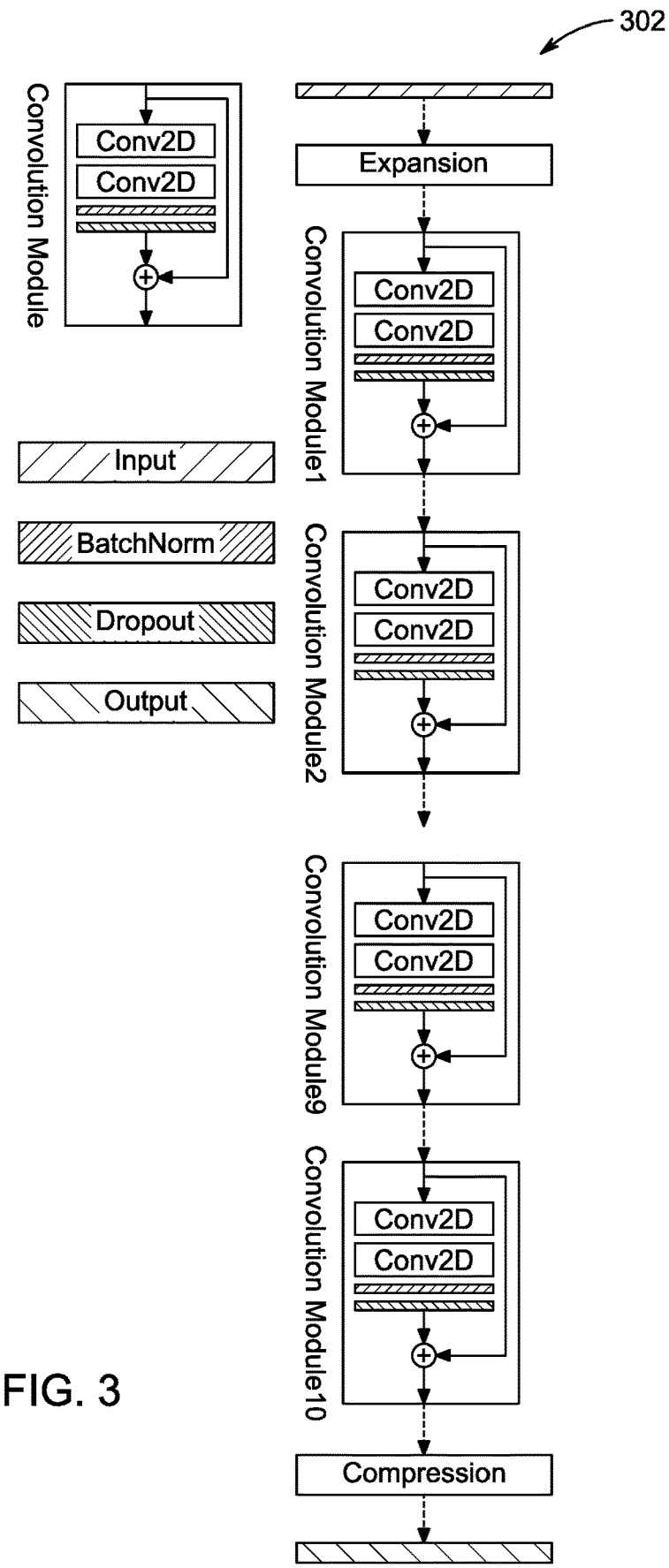
FIG. 3 illustrates an architecture of CNN based FBMC equalizer, according to exemplary aspects of the present disclosure.

The present disclosure describes deep FBMC method that utilizes the CNN equalizer. The deep FBMC employing the CNN equalizer may interchangeably be referred to as CNN based FBMC equalizer or deep FBMC CNN. The CNN based FBMC equalizer as described herein uses the max pooling technique as a pooling operation. The max pooling operation is used as it is computationally less expensive in comparison to the min pooling technique and the average pooling technique. The present disclosure uses Rectified Linear Unit (ReLU) (also known as ReLU activation function). According to the ReLU activation function, the function output is rectified for negative inputs. In an example, a non-linear operation of rectification with linear combination creates a combinatorial set of decision space where one decision space is separated by another decision space in a piece-wise fashion. The linear operation for positive inputs gives a constant gradient value that further reduces the computation and allows rapid learning. An architecture 302 of the CNN based FBMC equalizer is depicted in FIG. 3. Further, the CNN based FBMC equalizer includes a plurality of layers which include a plurality of convolution layers, a plurality of batch normalization layers, and a plurality of dropout layers, each having a dropout rate equal to 0.25. In an example, the plurality of convolution layers includes a plurality of compression layers, a plurality of expansion layers, and a plurality of conv2D layers. An expansion layer is a 2D-convolution layer having filters=32, kernel size=(3, 3), stride=(1,1), activation="Linear", and padding="same". A compression layer is a 2D-convolution layer having filters=1, kernel size=(1,1), stride=(1,1), activation="Linear", and padding="same". A cony 2D is a 2D-convolution layer having filters=32, kernel size=(3,3), stride=(1,1), activation="ReLu", and padding="same".

As shown in FIG. 3, the CNN based FBMC equalizer is constructed using ten (10) convolution modules, namely, a convolution module 1, a convolution module 2, and so on. In a convolution module, several small convolution layers are grouped which have a relatively small number of parameters to perform the computation of a single large convolution layer, which has a relatively large number of parameters.

According to aspects of the present disclosure, the CNN based FBMC equalizer may be a pre-trained model that evaluates the input signal based on previous analysis and makes a decision in a single iteration. In an example, multiple convolution modules are used to construct a deep architecture of the CNN based FBMC equalizer. Each convolution module includes two convolutions, dropout, and ReLU activation function layers, except the final layer which uses the linear layer. The CNN based FBMC equalizer can be trained on pre-stored pilot signal and received signal to estimate the channel behavior. After estimating the weights of neurons which provide desired performance, the trained CNN based FBMC equalizer can be used for equalization in a test scenario.

According to aspects of the present disclosure, the FBMC-OQAM system 100 is configured to receive a signal over a transmission medium. In an example, the signal may be received from a plurality of channels. Further, the FBMC-OQAM system 100 is configured to equalize the signal using the CNN based FBMC equalizer. The CNN based FBMC equalizer is configured to estimate the received signal without performing channel estimation. The FBMC-OQAM system 100 then outputs the estimated signal as a bit stream. Also, the FBMC-OQAM system 100 is configured to convert the estimated signal from a parallel format to a serial format before outputting the estimated signal as a bit stream.

In an aspect, after receiving the signal over the transmission medium, the FBMC-OQAM system 100 is configured to convert the signal from a serial format to a parallel format. Also, the FBMC-OQAM system 100 is configured to decompose the signal by a plurality of filter banks and convert the signal by a first algorithm. In an example, the first algorithm may be a fast Fourier transform.

Figures 4A, 4B:
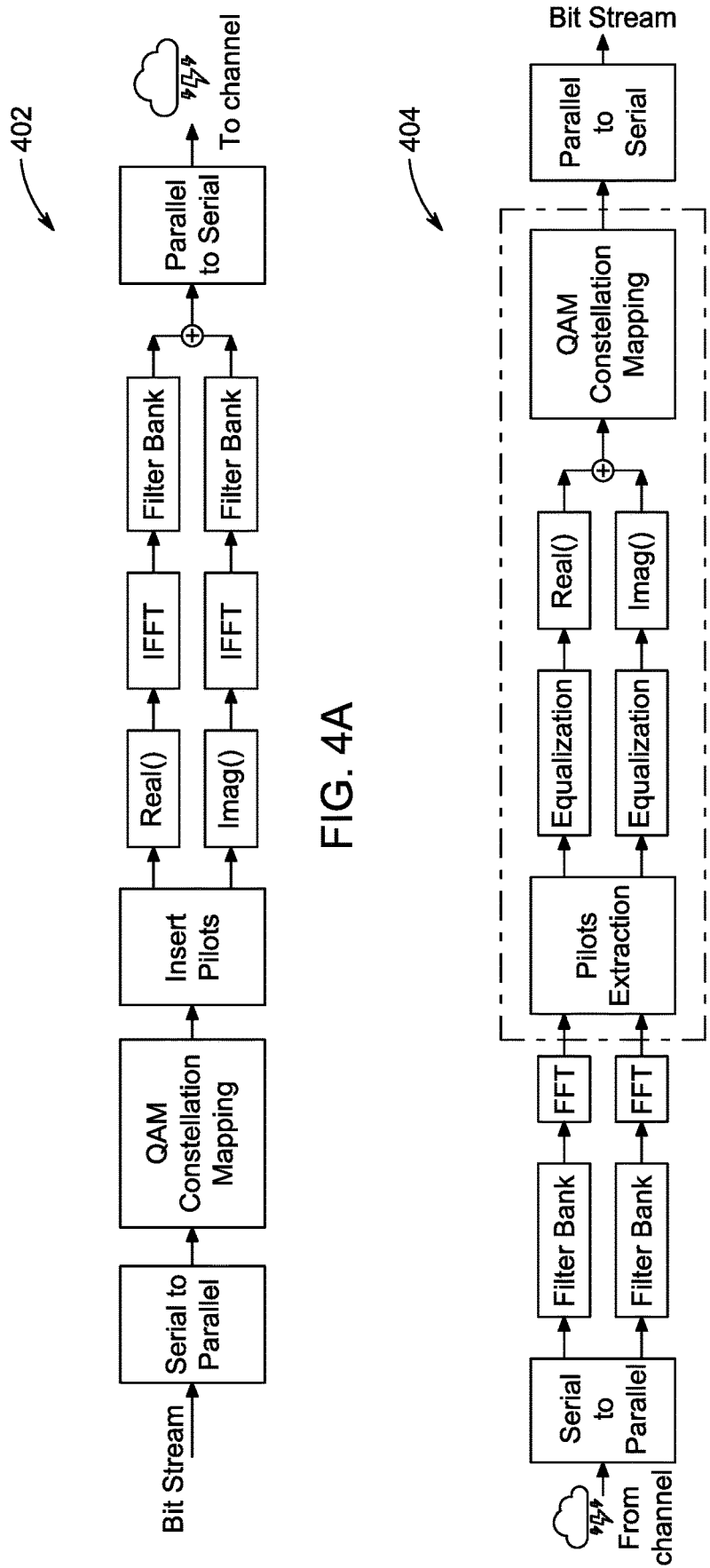
FIGS. 4A to 4C illustrate a system design for the CNN based FBMC equalizer, according to exemplary aspects of the present disclosure.
Figure 4C:
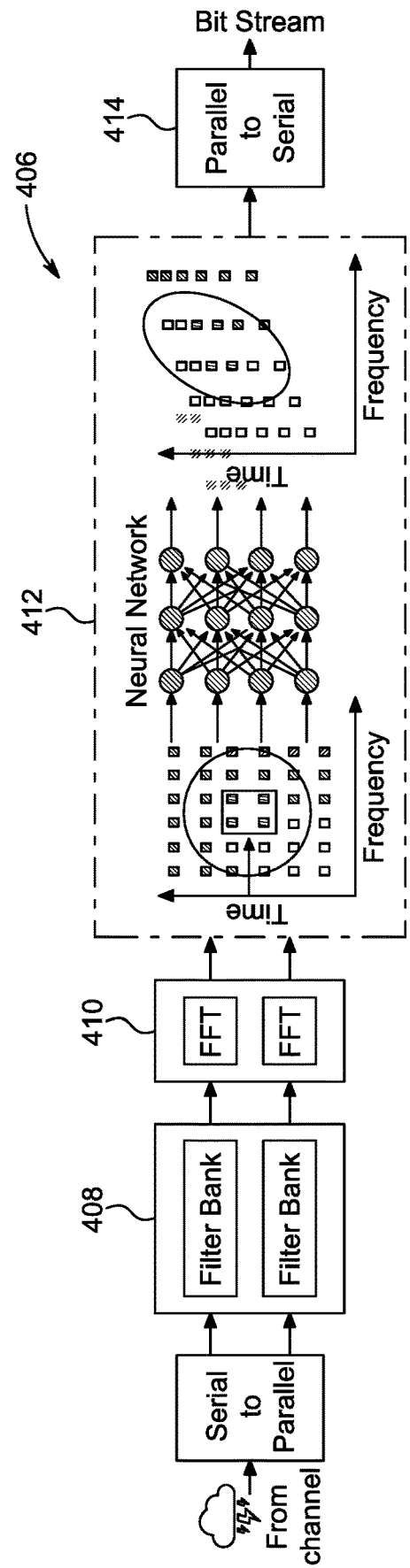

Overall system design for the CNN based FBMC equalizer is depicted in FIGS. 4A to 4C. FIG. 4A illustrates a representation 402 of a transmitter-side signal processing pipeline. FIG. 4B illustrates a representation 404 of a conventional receiver-side signal processing pipeline. FIG. 4C illustrates a representation 406 of CNN based receiver-side processing pipeline. As illustrated in FIG. 4C, a signal is received from a channel. Then, at block 408, the signal is converted from a serial format to a parallel format. At block 410, the signal is decomposed by filter banks. At block 412, the signal is converted using FFT. At block 414, the signal is equalized by the CNN equalizer. The CNN equalizer is configured to estimate the received signal without performing channel estimation. At block 416, the estimated signal is converted from a parallel format to a serial format prior. Then, the estimated signal is output as a bit stream.

Examples and Experiments

The following examples are provided to illustrate further and to facilitate the understanding of the present disclosure. Experimental Data and Analysis For the experiment, seven sets were generated for different signal to noise ratios i.e., 10 dB, 15 db, 20 dB, 25 dB, 30 dB, 35 dB, and 40 dB. For each SNR value, thousand (1000) samples were produced, and each sample included thirty (30) time representations and twenty-four (24) frequencies representations. From thousand (1000) samples, eight hundred (800) samples were used for training, hundred (100) samples were used for validation, and the remaining hundred (100) samples were used for testing.

Further, MATLAB code (MATLAB 2018) was used to generate input and output data for the FBMC-OQAM system 100 in a doubly selective channel. As a result, multiple signal sets were generated, representing the pilot signals. Also, the FBMC-OQAM system 100 was tested on keras tensor flow framework using python 3 on different subsets of data, and performance statistics were recorded.

In an aspect, four performance statistics were used to evaluate the performance of the FBMC-OQAM system 100. The four performance statistics include (1) computation time, (2) mean-absolute error in recovered and transmitted signal, (3) model complexity in terms of learning parameters, and (4) bit error rate (BER) between transmitted and received signal.

The FBMC-OQAM system 100 is a machine learning-based approach that requires a deep neural network model training using a limited amount of training data and computational resources. Further, since the FBMC-OQAM system 100 is trained multiple times for different channel conditions, the FBMC-OQAM system 100 is trained using a fast method approach.

The effective training of the CNN based FBMC equalizer depends on batch-size, regularization technique, learning rate, optimization algorithm, stopping conditions, data-shuffling, and loss function. An Adam optimization algorithm with default learning rate (step-size) and decay rates was used for training of the CNN based FBMC equalizer. The maximum number of allowed epochs was set to thousand (1000) while training of the CNN based FBMC equalizer was conditioned on reducing mean absolute error. For every epoch, the training dataset was shuffled randomly to improve generalization, and on completion of the training, a final mean absolute error value of the epoch was compared with the previous best value of error. If the newly updated weights did not support in improving the error, then it is counted as a patience value (or step). In an example, after thousand (1000) epochs or hundred (100) patience steps, the training is terminated. On every successful improvement in error, the weight of the CNN based FBMC equalizer was stored as a best model weight. Upon completion of the training, final weights from best model weights were loaded to test the CNN based FBMC equalizer. Further, the CNN based FBMC equalizer is used for all signal-to-noise ratio and channel conditions. Also, the use of the CNN based FBMC equalizer facilitates in significantly reducing the requirement for large memory or high power computing hardware. Further, the use of the CNN based FBMC equalizer in the FBMC-OQAM system 100 results in low computational complexity as the CNN based FBMC equalizer does not employ large matrix inversion as used in conventional Minimum Mean Squared Error (MMSE) equalizers and Zero Forcing (ZF) equalizers.

In the simulation setup, twenty-four (24) sub-carriers (i.e., L=24) and thirty (30) time symbols (i.e., K=30) were used, and five hundred (500) Monte Carlo simulation runs were used. The subcarrier spacing was set to 15 kHz. For OQAM implementation, the PAM modulation order was set to sixteen (16), which is equivalent to 256 QAM. Further, the Hermite prototype filter was used for waveform shaping at both transmitter and receiver. The SNR range 1 dB to 45 dB was used. The zero mean complex circular Gaussian channel vector 'h' was generated using the Jakes model for 2.5 GHz carrier frequency and 500 km/h vehicular speed, corresponding to a maximum Doppler shift of 1.16 kHz.

It was found that the CNN based FBMC equalizer with thirty two (32) channels in each layer produces the best results. A summary of computational complexity of the CNN based FBMC equalizer in terms of a number of learnable and non-learnable parameters (complexity) for different design choices (number of filters) is provided in table 1.

TABLE 1

Computational Complexity of the CNN based FBMC Equalizer

| Channels | Total Parameters | Trainable Parameters | Non-Trainable Parameters |
|---|---|---|---|
| 8× | 11729 | 11569 | 160 |
| 16× | 45345 | 45025 | 320 |
| 32× | 178241 | 177601 | 640 |
| 64× | 706689 | 705409 | 1280 |
| 128× | 2814209 | 2811649 | 2560 |
| 256× | 11231745 | 11226625 | 5120 |

It can be seen in Table 1 that by increasing the size of a channel (i.e., size of filters), the number of both trainable and non-trainable parameters is increased. The total parameters used in the CNN based FBMC equalizer with thirty two (32) channels is 178241 in comparison to conventional equalizer which is equal to 1245800. Hence, the computational complexity of the CNN based FBMC equalizer is much lesser than the conventional equalizer.

Figure 5A:
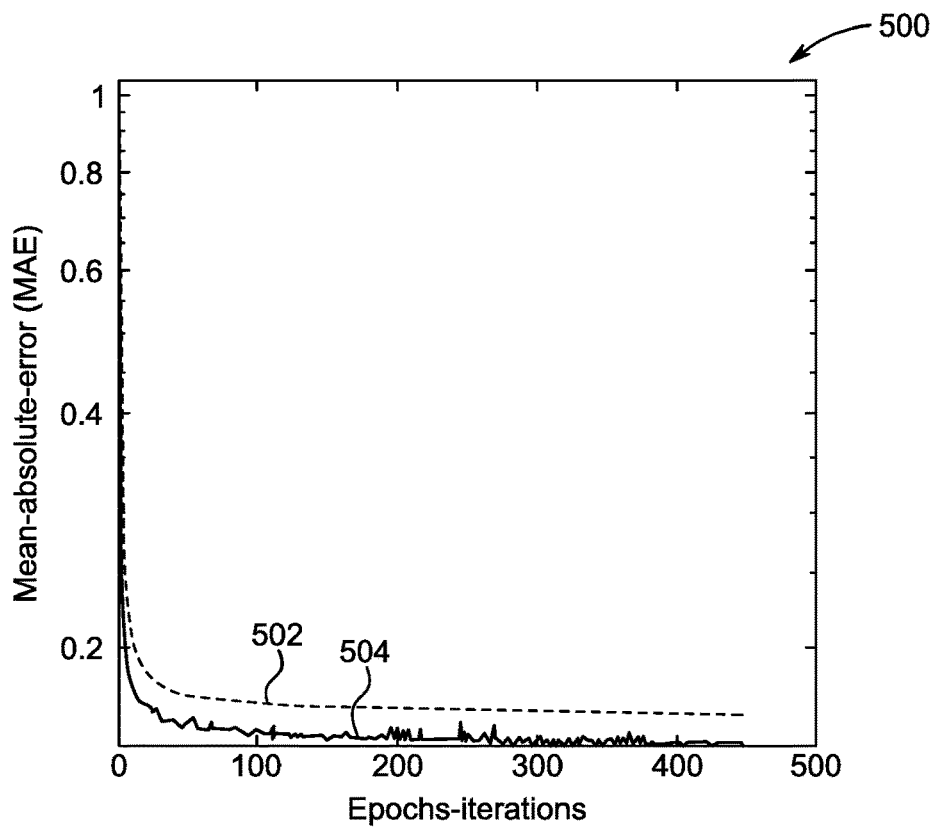
FIGS. 5A to 5F illustrate Mean Absolute Error (MAE) learning curves for training and validation phases with different channel sizes, according to exemplary aspects of the present disclosure.

FIGS. 5A to 5F illustrate Mean Absolute Error (MAE) learning curves for training and validation phases with different channel sizes, according to exemplary aspects of the present disclosure. In particular, training and validation performances in terms of MAE versus training epochs for the CNN based FBMC equalizer for different channel sizes (or filter sizes) are described in FIGS. 5A to 5F. FIG. 5A illustrates a plot 500 of MAE learning curve for training and validation phases for channel size equal to eight (8). In FIG. 5A, plot line 502 illustrates training loss and plot line 504 illustrates validation loss.

Figure 5B:
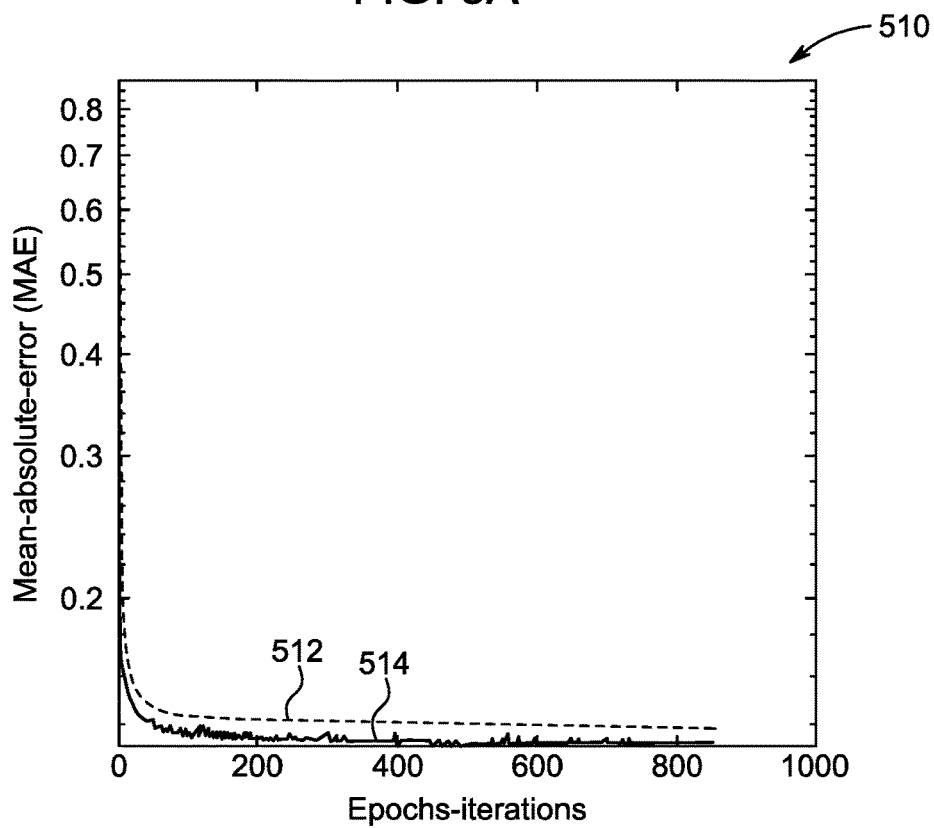
Figure 5C:
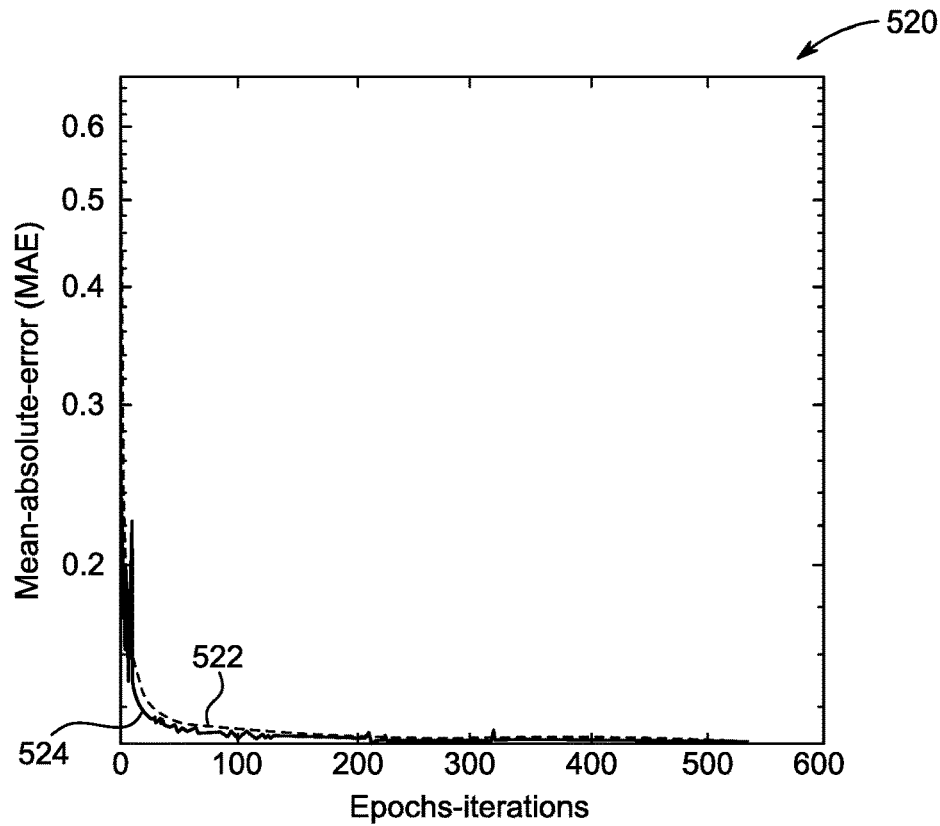

FIG. 5B illustrates a plot 510 of MAE learning curve for training and validation phases for channel size equal to sixteen (16). In FIG. 5B, plot line 512 illustrates training loss and plot line 514 illustrates validation loss. FIG. 5C illustrates a plot 520 of MAE learning curve for training and validation phases for channel size equal to thirty two (32). In FIG. 5C, plot line 522 illustrates training loss and plot line 524 illustrates validation loss.

Figure 5D:
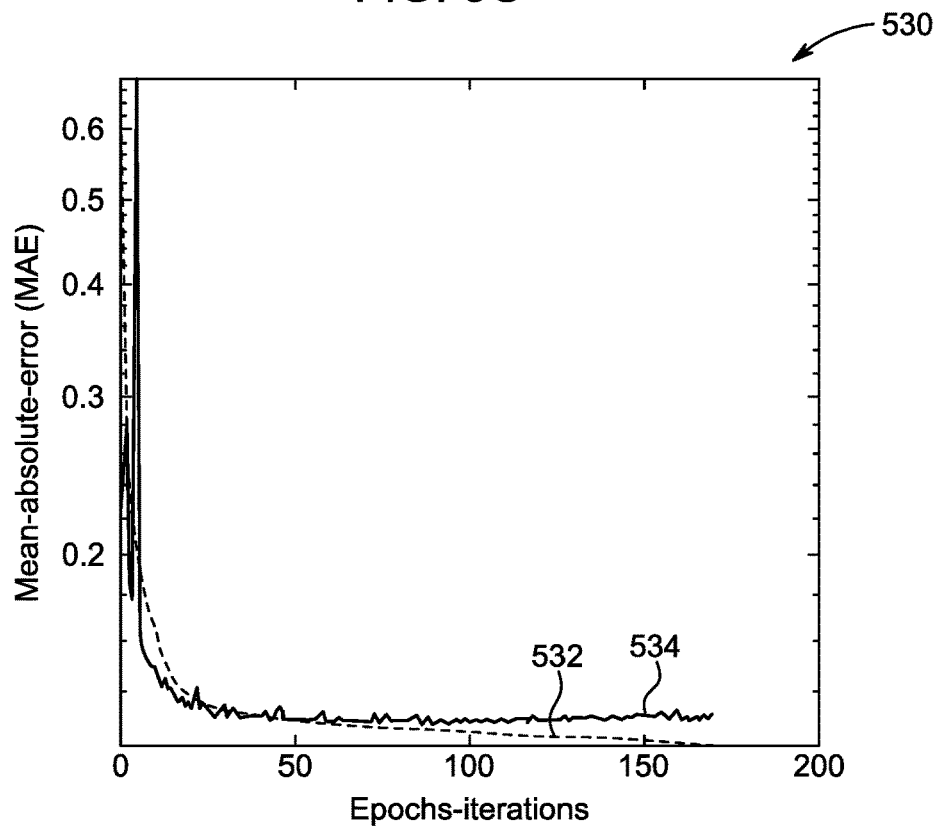
Figure 5E:
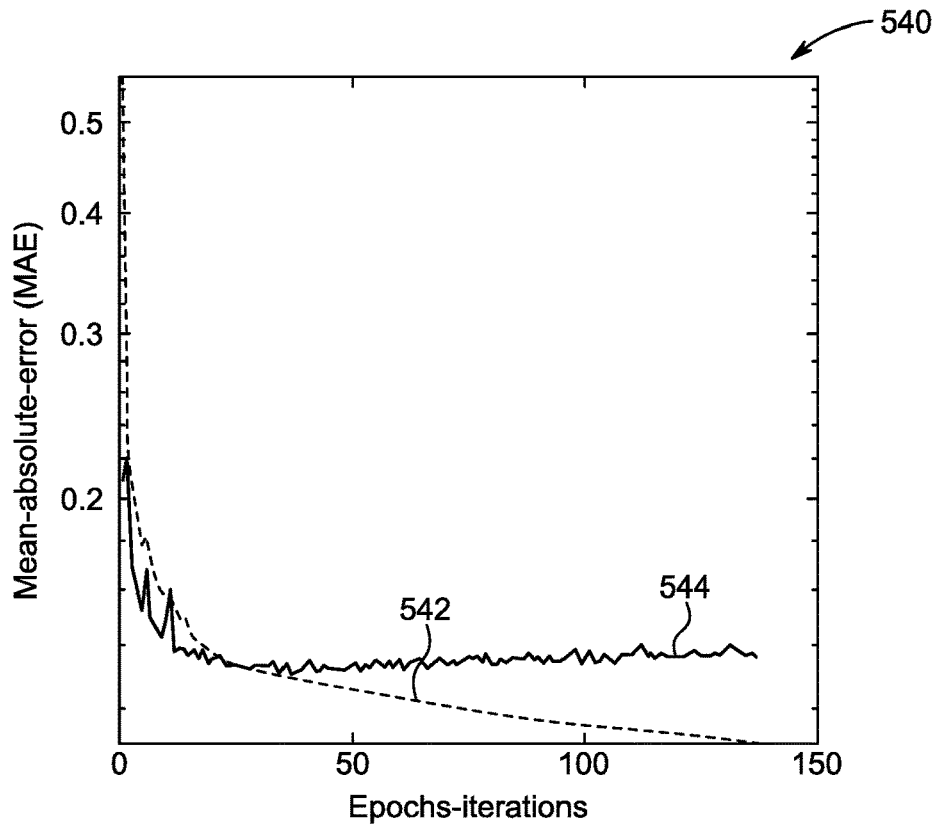
Figure 5F:
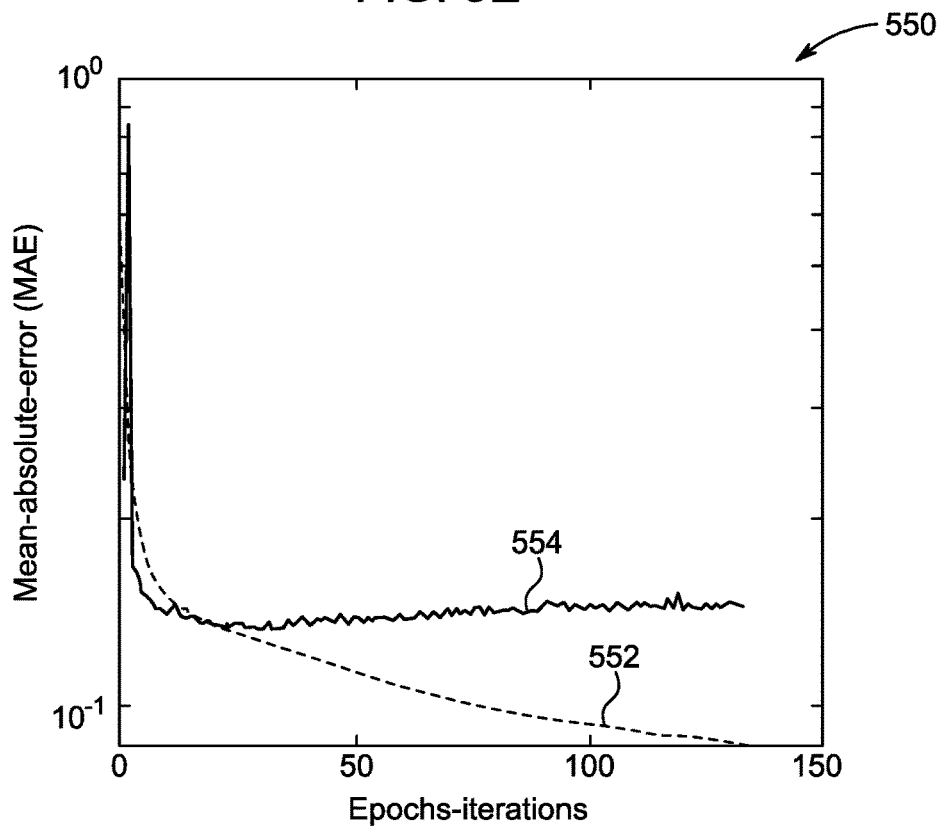

FIG. 5D illustrates a plot 530 of MAE learning curve for training and validation phases for channel size equal to sixty four (64). In FIG. 5D, plot line 532 illustrates training loss and plot line 534 illustrates validation loss. FIG. 5E illustrates a plot 540 of MAE learning curve for training and validation phases for channel size equal to one hundred and twenty eight (128). In FIG. 5E, plot line 542 illustrates training loss and plot line 544 illustrates validation loss. FIG. 5F illustrates a plot 550 of MAE learning curve for training and validation phases for channel size equal to two hundred and fifty six (256). In FIG. 5F, plot line 552 illustrates training loss and plot line 554 illustrates validation loss. It can be seen that the optimal performance is obtained when the channel size is thirty two (32).

Figure 6:
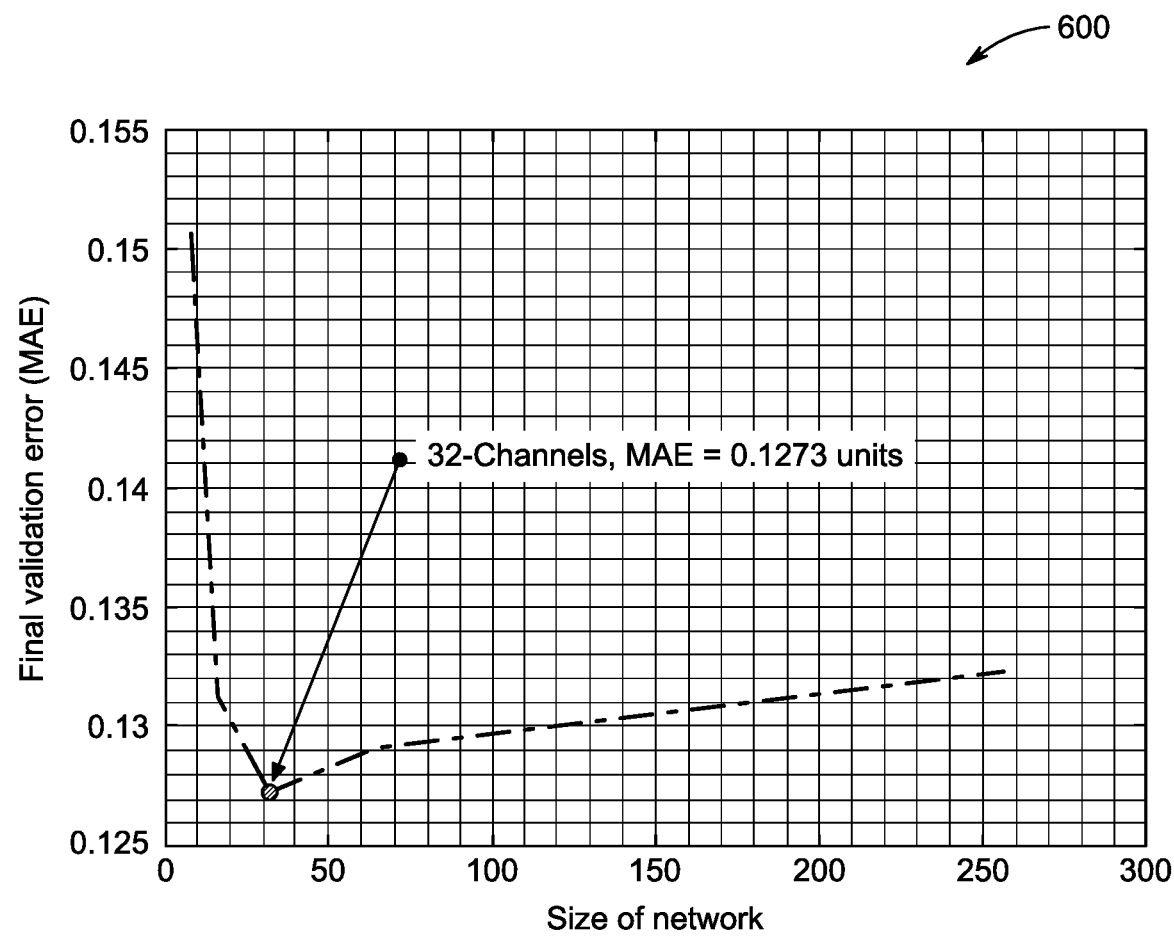
FIG. 6 illustrates a plot of validation MAE versus network size, according to exemplary aspects of the present disclosure.

The CNN based FBMC equalizer is selected based on optimal validation performance and minimal complexity. FIG. 6 illustrates a plot 600 of validation MAE versus network size which shows efficiency versus complexity of the CNN based FBMC equalizer. It can be observed in FIG. 6 that the optimal performance is obtained for a network size of thirty two (32) channels.

Figure 7:
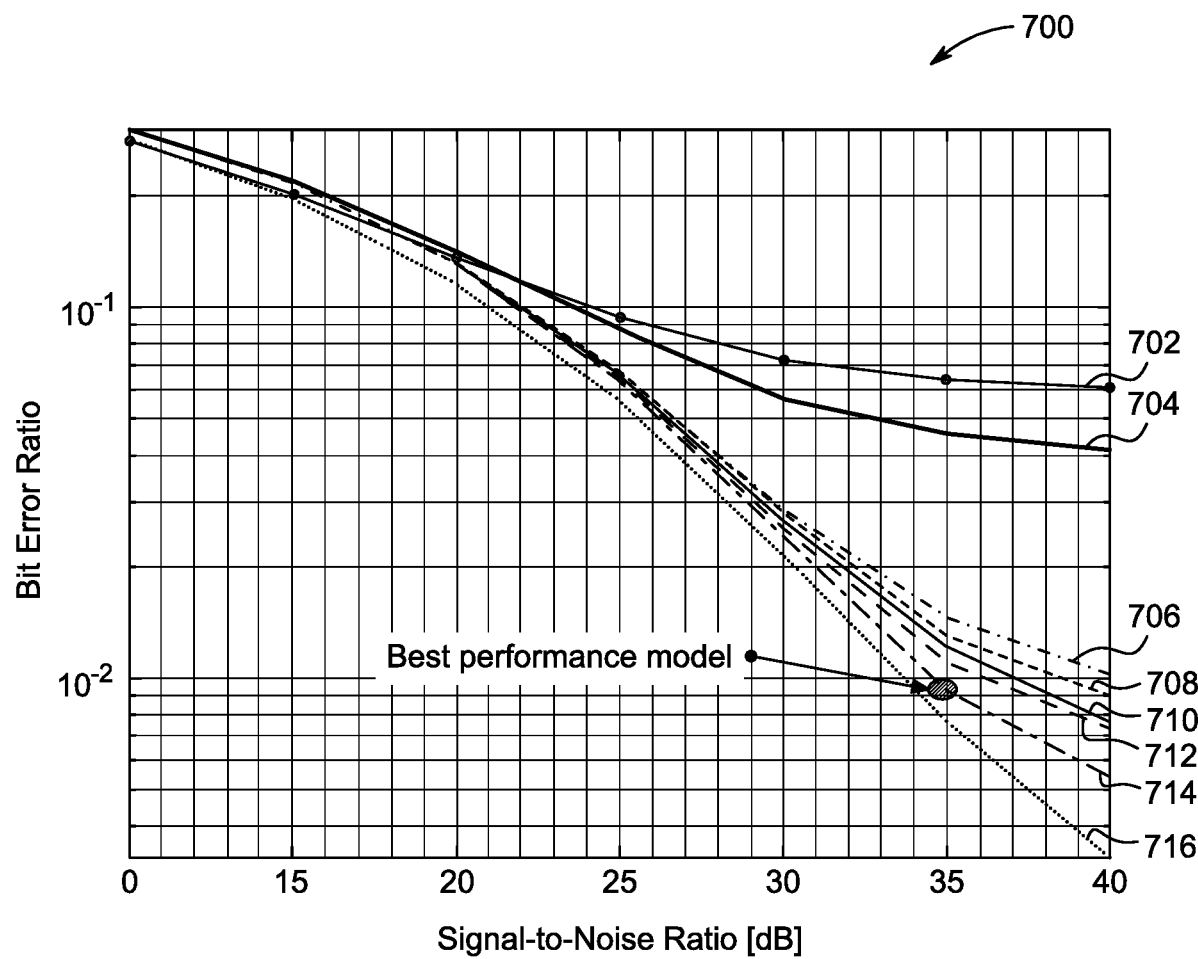
FIG. 7 illustrates a plot of Bit Error Rate (BER) versus Signal to Noise Ratio (SNR) performance comparison for the CNN based FBMC equalizer, according to exemplary aspects of the present disclosure.

FIG. 7 illustrates a plot 700 of Bit Error Rate (BER) versus Signal to Noise Ratio (SNR) performance comparison for the CNN based FBMC equalizer, according to exemplary aspects of the present disclosure. In FIG. 7, the BER performance of the CNN based FBMC equalizer is plotted for various channel sizes and compared with the BER performance of the one-tap equalizer and full block MMSE equalizer. Plot line 702 illustrates BER versus SNR performance of one-tap equalizer, plot line 704 illustrates BER versus SNR performance of full block MMSE equalizer, plot line 706 illustrates BER versus SNR performance of the CNN based FBMC equalizer with eight (8) channels, plot line 708 illustrates BER versus SNR performance of the CNN based FBMC equalizer with sixteen (16) channels, plot line 710 illustrates BER versus SNR performance of the CNN based FBMC equalizer with thirty two (32) channels, plot line 712 illustrates BER versus SNR performance of the CNN based FBMC equalizer with sixty four (64) channels, plot line 714 illustrates BER versus SNR performance of the CNN based FBMC equalizer with one hundred and twenty eight (128) channels, and plot line 716 illustrates BER versus SNR performance of the CNN based FBMC equalizer with two hundred and fifty six (256) channels.

It can be observed in FIG. 7 that the method has acquired much better performance than that of the one-tap equalizer. Moreover, the CNN based FBMC equalizer with thirty two (32) channels has achieved almost the same BER performance as the one obtained by the full block MMSE equalizer but with much lesser computational complexity as it does not involve large matrix inversion computation.

Figure 8:
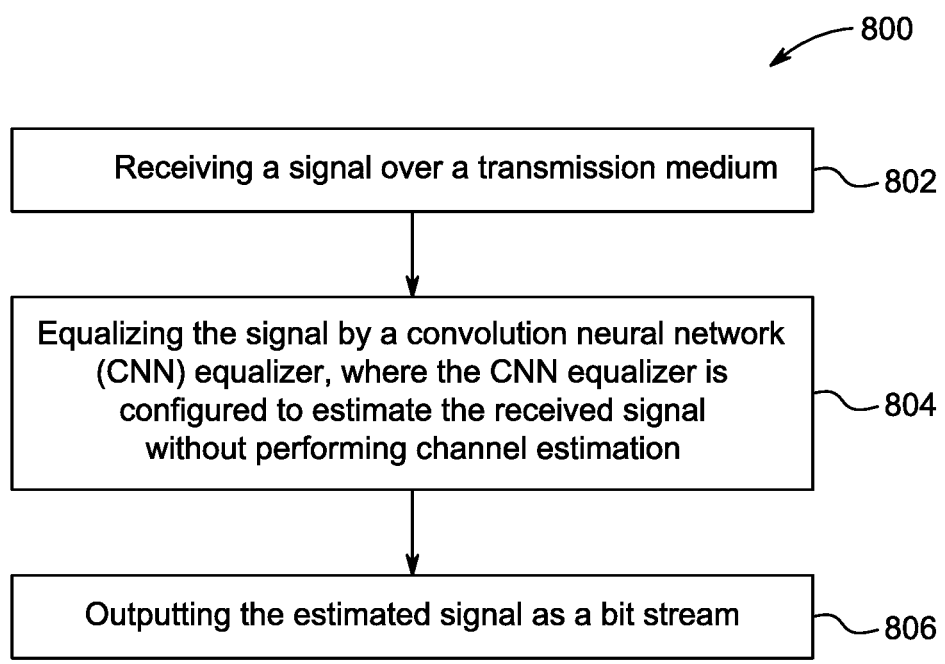
FIG. 8 illustrates a method of performing an equalization in the FBMC-OQAM system, according to aspects of the present disclosure.

FIG. 8 illustrates a method 800 of performing an equalization in the FBMC-OQAM system 100, according to aspects of the present disclosure.

At step 802, the method 800 includes receiving a signal over a transmission medium.

At step 804, the method 800 includes equalizing the signal by a CNN equalizer, where the CNN equalizer is configured to estimate the received signal without performing channel estimation. The CNN equalizer includes a plurality of layers which include a plurality of convolution layers, a dropout layer, and a plurality of activation function layers. Further, the plurality of activation function layers include a plurality of rectified linear unit activation function layers and a plurality of linear layers. The CNN equalizer is trained on inputted pilot signal sets as training samples. The inputted pilot signal sets include previously transmitted or known pilot signal sets. In an example, the inputted pilot signal sets include currently received signal sets. Further, separate sets of training samples are used which correspond to different noise ratios. In an aspect, the CNN equalizer uses skip connections by allowing at least one input layer to by-pass adjacent layers on route to a target layer. Further, the CNN equalizer uses a max pooling technique as a pooling operation.

At step 806, the method 800 includes outputting the estimated signal as a bit stream. In an aspect, the estimated signal is converted from a parallel format to a serial format prior to being output as a bit stream.

According to an aspect, after receiving the signal over the transmission medium, the signal is converted from a serial format to a parallel format. Thereafter, the signal is decomposed by a plurality of filter banks. Further, the signal is converted by a first algorithm. In an example, the first algorithm is a fast Fourier transform.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of performing an equalization in filter bank multi-carrier (FBMC)-offset quadrature amplitude modulation (OQAM) system, comprising:
   receiving a signal over a transmission medium;
   equalizing the signal by a convolution neural network (CNN) equalizer, wherein the CNN equalizer is configured to estimate the received signal without performing channel estimation; and
   outputting the estimated signal as a bit stream,
   wherein the CNN equalizer is trained on inputted pilot signal sets as training samples and the inputted pilot signal sets include currently received signal sets.

2. The method of claim 1, wherein the CNN includes a plurality of layers which include a plurality of convolution layers, a dropout layer, and a plurality of activation function layers.

3. The method of claim 2, wherein the plurality of activation function layers include a plurality of rectified linear unit activation function layers and a plurality of linear layers.

4. The method of claim 1, wherein inputted pilot signal sets include previously transmitted or known pilot signal sets.

5. The method of claim 1, wherein separate sets of training samples are used which correspond to different noise ratios.

6. The method of claim 2, wherein the CNN equalizer uses skip connections by allowing at least one input layer to by-pass adjacent layers on route to a target layer.

7. The method of claim 5, wherein the CNN equalizer uses a max pooling technique as a pooling operation.

8. A method of performing an equalization in filter bank multi-carrier (FBMC)-offset quadrature amplitude modulation (OQAM) system, comprising:
   receiving a signal over a transmission medium;
   equalizing the signal by a convolution neural network (CNN) equalizer, wherein the CNN equalizer is configured to estimate the received signal without performing channel estimation; and
   outputting the estimated signal as a bit stream, wherein the estimated signal is converted from a parallel format to a serial format prior to being output as a bit stream; and
   after receiving the signal over the transmission medium, converting the signal from a serial format to a parallel format,
      decomposing the signal by a plurality of filter banks; and
      converting the signal by a first algorithm.

9. The method of claim 8, wherein the first algorithm is a fast Fourier transform.

10. A filter bank multi-carrier (FBMC)-offset quadrature amplitude modulation (OQAM) system, comprising:
   processing circuitry configured to:
      receive a signal over a transmission medium;
      equalize the signal by a convolution neural network (CNN) equalizer, wherein the CNN equalizer is configured to estimate the received signal without performing channel estimation; and
      output the estimated signal as a bit stream, wherein the CNN equalizer is trained on inputted pilot signal sets as training samples and the inputted pilot signal sets include currently received signal sets.

11. The system of claim 10, wherein the CNN includes a plurality of layers which include a plurality of convolution layers, a dropout layer, and a plurality of activation function layers.

12. The system of claim 11, wherein the plurality of activation function layers include a plurality of rectified linear unit activation function layers and a plurality of linear layers.

13. The system of claim 10, wherein inputted pilot signal sets include previously transmitted or known pilot signal sets.

14. The system of claim 10, wherein separate sets of training samples are used which correspond to different noise ratios.

* * * * *